United States Patent [19]

Sasaki

[11] Patent Number: 5,346,032

[45] Date of Patent: Sep. 13, 1994

[54] TORQUE DISTRIBUTION CONTROL SYSTEM FOR FOUR WHEEL DRIVE VEHICLE

[75] Inventor: Hiroki Sasaki, Yokohama, Japan

[73] Assignee: Nissan Motor Co., Ltd., Yokohama, Japan

[21] Appl. No.: 66,268

[22] Filed: May 25, 1993

[30] Foreign Application Priority Data

Jun. 8, 1992 [JP] Japan ................................. 4-147119

[51] Int. Cl.$^5$ .......................................... B60K 17/348
[52] U.S. Cl. ................................... 180/233; 180/247; 180/248; 364/424.1
[58] Field of Search ............... 180/233, 247, 248, 197; 364/424.1

[56] References Cited

U.S. PATENT DOCUMENTS

| | | |
|---|---|---|
| 4,773,500 | 9/1988 | Naito . |
| 4,776,424 | 10/1988 | Naito . |
| 4,874,056 | 10/1989 | Naito . |
| 4,887,689 | 12/1989 | Naito . |
| 4,890,685 | 1/1990 | Naito . |
| 5,010,974 | 4/1991 | Matsuda . |
| 5,060,747 | 10/1991 | Eto ..................................... 180/197 |
| 5,251,719 | 10/1993 | Eto et al. ............................. 180/197 |

FOREIGN PATENT DOCUMENTS 63-203421 8/1988 Japan .
2-171330 7/1990 Japan .

*Primary Examiner*—Mitchell J. Hill
*Attorney, Agent, or Firm*—Lowe, Price, LeBlanc & Becker

[57] ABSTRACT

A driving torque distribution control system for a four wheel drive vehicle includes a torque distributing clutch provided in a drive path for the front wheels, and a controller for controlling a driving torque transmitted to the front wheels through the clutch, in accordance with a corrected front and rear wheel speed difference which is a difference resulting from subtraction of a dead band from a sensed actual front and rear wheel speed difference. In order to improve the controllability near the cornering limits of the vehicle without deteriorating the driving ability in a low lateral acceleration cornering operation, the controller sets the dead band so that the dead band increases as the lateral acceleration of the vehicle increases.

11 Claims, 6 Drawing Sheets

TORQUE DISTRIBUTION CONTROL SYSTEM FOR FOUR WHEEL DRIVE VEHICLE

BACKGROUND OF THE INVENTION

The present invention relates to a driving force distribution control system for controlling a driving force distribution between front and rear wheels of a four wheel drive vehicle, and more specifically to a driving force distribution control system for improving a controllability of a vehicle near the cornering limits of the vehicle.

Japanese Patent provisional publication 63-203421 and a U. S. Pat. No. 5,060,747, for example, disclose driving torque distribution control systems designed to control a front wheel driving torque as a function of a front and rear wheel speed difference by using a control gain which is decreased as the lateral acceleration of the vehicle increases.

However, this conventional system is not completely satisfactory in some cases. When, for example, the front and rear wheel speed difference is increased by a driver's operation on the accelerator during a high lateral acceleration turning, these conventional systems increase the front wheel driving torque. This increase of the front wheel driving torque results in a decrease in the front wheel side force, and hence an increase in the understeer tendency. When the driver depresses the accelerator pedal toward a clipping point in a middle period B in a high lateral acceleration turning motion (as shown in FIG. 9), this conventional control system responds to this driver's accelerator operation by increasing the front wheel driving torque, and as a result, increases the understeer of the vehicle due to a decrease of the front wheel side force. Therefore, the course of the cornering motion of the vehicle deviates outwards (as shown in FIG. 9), and the vehicle cannot reach the target clipping point.

SUMMARY OF THE INVENTION

It is therefore an object of the present invention to provide a vehicle driving force distribution control system which can improve the controllability in a high lateral acceleration cornering and ensure the driving ability in a low lateral acceleration cornering.

It is another object of the present invention to provide a vehicle driving force distribution control system which can improve both the driving ability in the low lateral acceleration range and the controllability in the high lateral acceleration range by varying a torque distribution smoothly.

it is still another object of the present invention to provide a driving force distribution control system which can improve the vehicle cornering stability more effectively when the vehicle is in a high lateral acceleration turning motion of a small turning radius, but which attaches more importance to the vehicle controllability when the turning radius increases in the high lateral acceleration range.

According to the present invention, a driving force distribution control system for a vehicle comprises a torque distributing clutch for varying a driving torque transmitted from an engine of the vehicle to front wheels of the vehicle in accordance with a control signal; a front and rear wheel speed difference sensing means for sensing an actual front and rear wheel speed difference; a lateral acceleration sensing means for sensing a lateral acceleration of the vehicle; a dead band setting means for setting a predetermined front and rear wheel speed difference dead band in accordance with the lateral acceleration at least when the lateral acceleration is high; and a driving force distribution controlling means for producing said control signal in accordance with a difference resulting from subtraction of said dead band from said actual front and rear wheel speed difference.

DETAILED DESCRIPTION OF THE INVENTION

Figure 2:
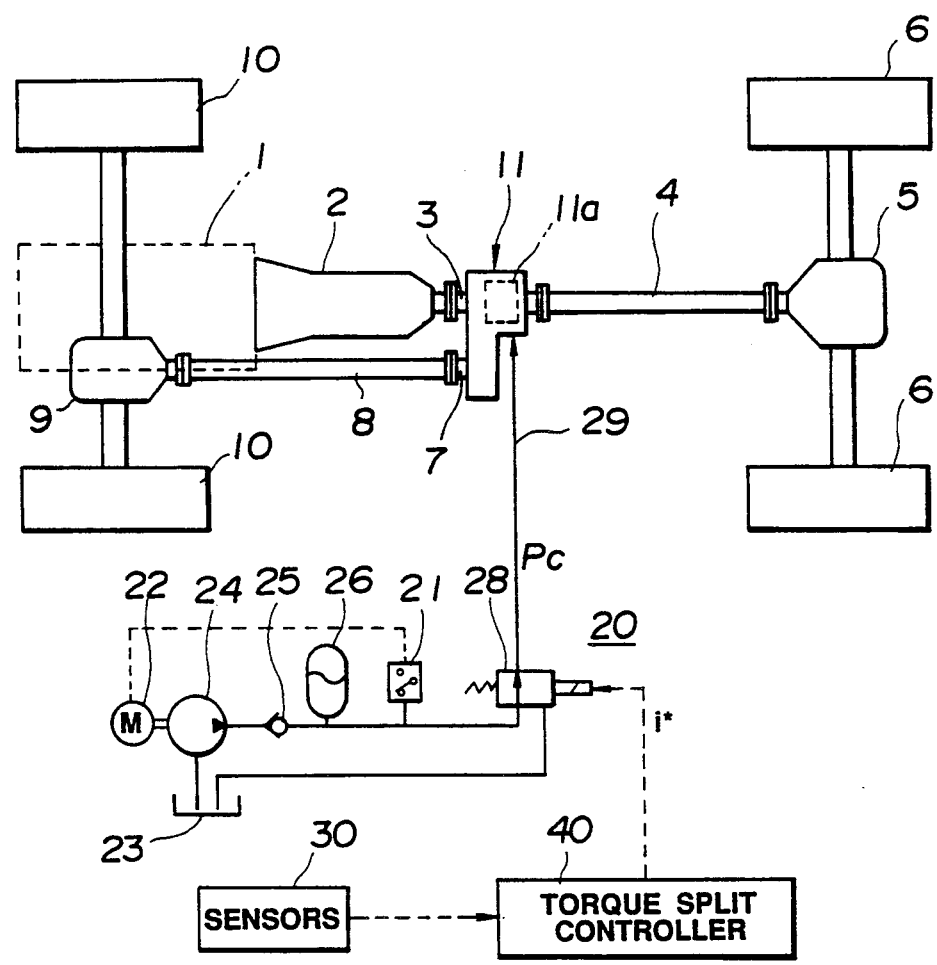
FIG. 2 is a schematic view showing a vehicle equipped with a torque split (driving force distribution) control system according to one embodiment of the present invention.
Figure 3:
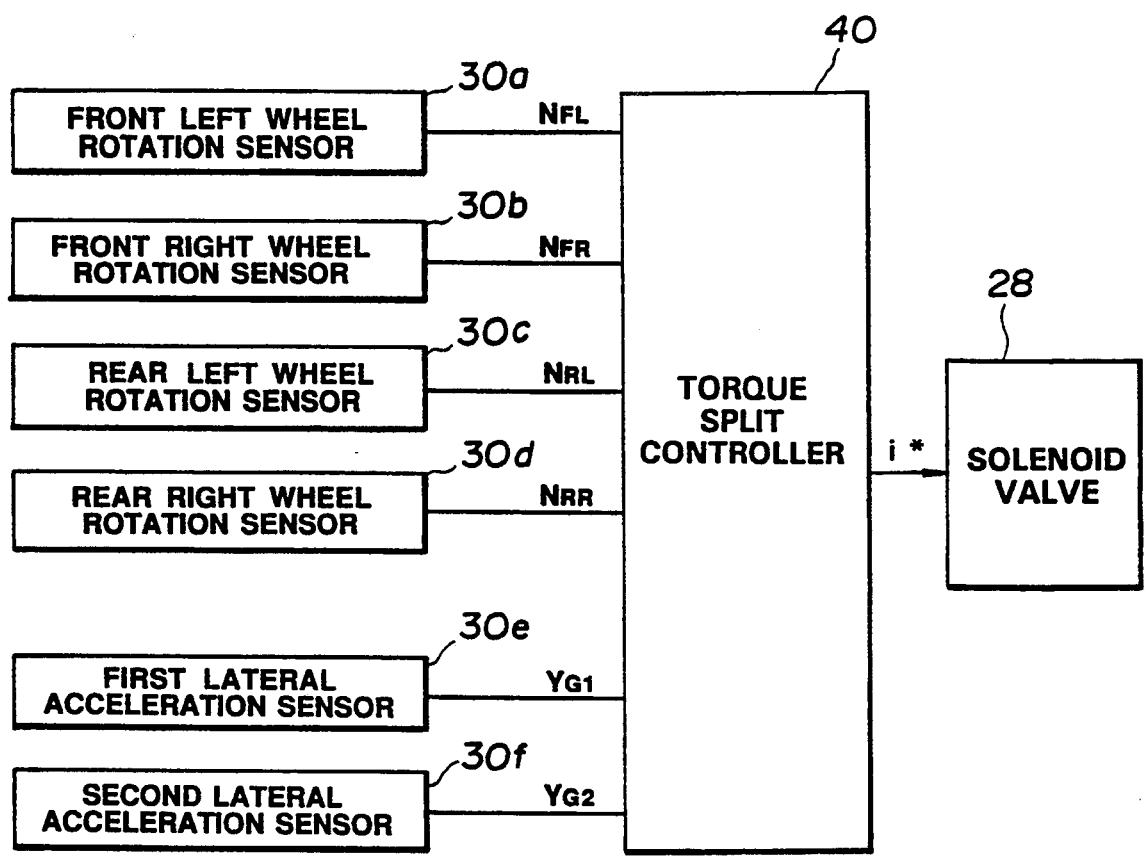
FIG. 3 is a block diagram showing an electronic control system employed in the control system shown in FIG. 2.
Figure 4:
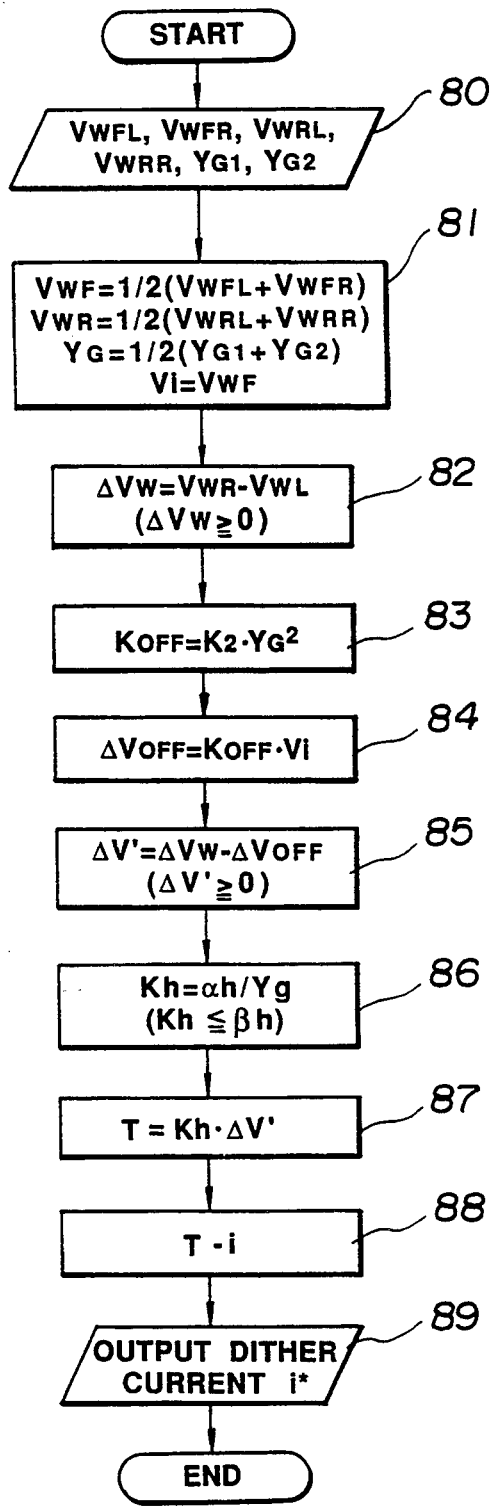
FIG. 4 is a flow chart showing a control procedure performed by the control system shown in FIG. 2.

FIGS. 2, 3 and 4 show a vehicle equipped with a torque split (or torque distribution) control system according to one embodiment of the present invention.

The vehicle shown in FIG. 2 is a four wheel drive vehicle based on a rear wheel drive system. This vehicle includes a power unit and a drive system. The power unit includes an engine 1 and a transmission 2. The drive system includes a transfer input shaft 3, a rear propeller shaft 4, a rear differential 5, rear wheels 6, a transfer output shaft 7, a front propeller shaft 8, a front differential 9, and front wheels 10. The engine torque transmitted through the transmission 2 from the engine is directly transmitted to the rear wheels 6. The engine torque, on the other hand, is transmitted to the front wheels 10 indirectly through a transfer 11 having a transfer clutch 11a provided between the transfer input and output shafts 3 and 7 in a front wheel drive line. Similar transfers and torque distribution systems are disclosed in many documents. Some examples are U.S. Pat. Nos. 4,773,500; 4,776,424; 4,874,056; 4,887,689; 4,890,685; and 5,010,974, and Japanese Patent Application No. 63-325379.

The torque split control system is designed to control the distribution of the driving force between the front and rear wheels adequately so as to improve both of the driving performance and the steering performance. The torque split control system of this illustrated example includes at least the transfer 11 including the transfer clutch 11a, a hydraulic system 20 for producing a control oil pressure Pc for the transfer clutch 11a, a sensor group 30 for detecting various vehicle operating conditions and a torque split controller 40 for producing a control signal in the form of a dither current i* to control a solenoid valve 28 of the hydraulic system 20. In this example, the transfer clutch (or torque distributing clutch) 11a is a wet type multiple disc friction clutch.

The hydraulic system 20 of this example includes at least an oil pump 24 driven by a motor 22 which is switched on and off by a relief switch 21, a reservoir tank 23, a check valve 25, an accumulator 26, and the above-mentioned solenoid valve 28. The pump 24 sucks oil from the reservoir tank 23 and produces a pump output pressure (primary pressure). The accumulator 26 receives the oil pressure from the pump 24 through the check valve 25, and stores the oil pressure. The solenoid valve 28 receives a line pressure (secondary pressure) from the accumulator 26, and produces the clutch control oil pressure Pc by regulating the line pressure in according with the solenoid driving dither current i* supplied from the torque split controller 40. A control oil pressure pipe 29 carries the control oil pressure Pc from the solenoid valve 28 to a clutch oil port of the transfer 11. In this way, the torque split control system can vary the engagement force of the transfer clutch 11a continuously and smoothly.

The sensor group 30 of this example, as shown in FIG. 3, includes a front left wheel rotation sensor 30a, a front right wheel rotation sensor 30b, a rear left wheel rotation sensor 30b, a rear right wheel rotation sensor 30c, and first and second lateral acceleration sensors 30e and 30f. Each of the wheel rotation sensors 30a-30c senses the rotation of the corresponding wheel and produces a signal representing the number of revolutions $N_{FL}$, $N_{FR}$, $N_{RL}$ or $N_{RR}$ of the corresponding wheel. Each of the lateral acceleration sensors 30e and 30f senses the lateral acceleration of the vehicle, and produces a signal representing the sensed lateral acceleration $Y_{G1}$ or $Y_{G2}$. These sensors are all connected with the torque split controller 40 as shown in FIG. 40.

The torque split controller 40 of this example produces the dither signal i* to control the solenoid valve 28 in accordance with the sensor output signals by performing a control procedure shown in FIG. 4. (The torque split controller 40 may include, as a main component, an onboard microcomputer, and repeat the program shown in FIG. 4 periodically.)

At a step 80 shown in FIG. 4, the controller 40 reads the current values of the sensor signals, and determines a front left wheel speed $V_{WFL}$, a front right wheel speed $V_{WFR}$, a rear left wheel speed $V_{WRL}$, a rear right wheel speed $V_{WRR}$, and first and second lateral accelerations $Y_{G1}$ and $Y_{G2}$.

At a step 81, the controller 40 calculates a front wheel speed $V_{WF}$, a rear wheel speed $V_{WR}$, a lateral acceleration $Y_G$, and a vehicle body speed $V_i$. The front wheel speed is an arithmetic mean of the front left wheel speed and the front right wheel speed. That is, $V_{WF}=(V_{WFL}+V_{WFR})/2$. The rear wheel speed is an arithmetic mean of the rear left and right wheel speeds, and given by $V_{WR}=(V_{WRL}+V_{WRR})/2$. The lateral acceleration $Y_G$ is an arithmetic mean of the first and second lateral acceleration $Y_{G1}$ and $Y_{G2}$, and given by $Y_G=(Y_{G1}+Y_{G2})/2$. The operation of the step 81 correspond to a lateral acceleration determining means. The controller 40 sets the vehicle body speed $V_i$ equal to the front wheel speed $V_{WF}$. That is, $V_i=V_{WF}$. This operation corresponds to a vehicle speed determining means.

At a step 82, the controller 40 determines a sensed (actual) front and rear wheel speed difference $\Delta V_W$ which is a difference resulting from subtraction of the sensed front wheel speed $V_{WF}$ from the sensed rear wheel speed $V_{WR}$. That is, $\Delta V_W=V_{WR}-V_{WF}$, provided that $\Delta V_W \geq 0$. This step 82 corresponds to a front and rear wheel speed difference determining means.

Figure 6:
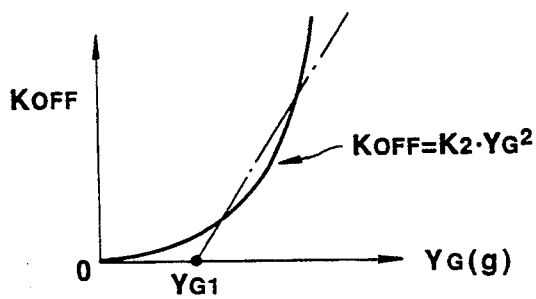
FIG. 6 is a graph showing a characteristic of a dead band coefficient employed in the control system shown in FIG. 2.

At a step 83, the controller 40 determines a dead band coefficient $K_{OFF}$. In this example, the dead band coefficient $K_{OFF}$ is proportional to the second power of the lateral acceleration, and given by $K_{OFF}=K_2 \cdot Y_G^2$. In this equation, $K_2$ is a predetermined constant. Therefore, the dead band coefficient $K_{OFF}$ varies with the lateral acceleration $Y_G$, as shown in the graph of FIG. 6.

At a step 84, the controller 40 determines a front and rear wheel speed difference dead band $\Delta V_{OFF}$ which is a product obtained by multiplying the vehicle body speed $V_i$ by the dead band coefficient $K_{OFF}$. That is, $\Delta V_{OFF}=K_{OFF} \cdot V_i$. The steps 83 and 84 correspond to a dead band setting means.

At a step 85, the controller 40 determines a corrected front and rear wheel speed difference $\Delta V'$ which is a difference resulting from subtraction of the dead band $\Delta V_{OFF}$ from the sensed front and rear wheel speed difference $\Delta V_W$. That is, $\Delta V'=\Delta V_W-\Delta V_{OFF}$, provided that $\Delta V' \geq 0$.

At a step 86, the controller 40 determines a control gain $K_h$ which is inversely proportional to the lateral acceleration $Y_G$. In this example, the control gain $K_h$ is a product obtained by multiplying the reciprocal of the lateral acceleration $Y_G$ by a predetermined constant $\alpha h$, provided that $K_h \leq \beta h$, and expressed as $K_h=\alpha h/Y_G$. For example, $\alpha h=1$ and $\beta h=10$.

At a step 87, the controller 40 determines a desired clutch torque T by using the corrected front and rear wheel speed difference $\Delta V'$ obtained at the step 85 and the control gain $K_h$ obtained at the step 86. In this example, T is equal to a product obtained by multiplying the corrected wheel speed difference $\Delta V'$ by the control gain $K_h$, and expressed as $T=K_h \cdot \Delta V'$.

At a step 88, the controller 40 determines a solenoid driving current i corresponding to the desired clutch torque T by using a predetermined T-i characteristic table.

At a step 89, the controller 40 delivers a dither current i* (for example, i±0.1A 100Hz) to the solenoid valve 28.

The steps 85-89 correspond to a driving force distribution controlling means.

The vehicle equipped with this control system is operated as follows:

(1) Straight Line Driving

When the vehicle is moving straight ahead, the lateral acceleration is null. Accordingly, the controller 40 sets the dead band coefficient $K_{OFF}$ equal to zero at the step 83, and sets the dead band $\Delta V_{OFF}$ also equal to zero at the step 84. In this case, the corrected front and rear wheel speed difference $\Delta V'$ is equal to the sensed actual front and rear wheel speed difference $\Delta V_W$. The controller 40 further determines the desired clutch torque T by using the control gain $K_h$ which is set equal to a maximum value ($K_{hmax}$) of the control gain, as shown by a broken line in FIG. 5. In this straight line driving operation, the torque split control system controls the driving torque distribution in the following manner.

Rapid start: When the vehicle is started rapidly, and the driving torque increases, the control system increases the clutch torque T steeply with an increase of the front and rear wheel speed difference. The driving torque transmitted to the front wheels 10 reaches the maximum level at a relatively small amount of the front and rear wheel speed difference. In this way, this control system can improve the starting performance and stability of the vehicle by using the front and rear wheel driving force distribution ratio approximately equal to 50:50.

Constant speed operation: When the vehicle is driven approximately at a constant vehicle speed, the front and rear wheel speed difference is zero or very small in the low and medium vehicle speed ranges, and accordingly, the front and rear wheel driving torque distribution ratio is approximately equal to 0:100. When the vehicle speed is high, however, the control system delivers the driving torque corresponding to the running resistance to the front wheels, and by so doing, improves the high speed stability of the vehicle.

Acceleration: When the vehicle is accelerated, the front and rear wheel speed difference increases in accordance with the magnitude of the acceleration. Therefore, the control system varies the front and rear wheel driving torque distribution ration from 0:100 to 50:50 in accordance with the magnitude of the acceleration of the vehicle. In this way, this control system improves the accelerating performance and stability of the vehicle.

(2) Cornering

Figure 5:
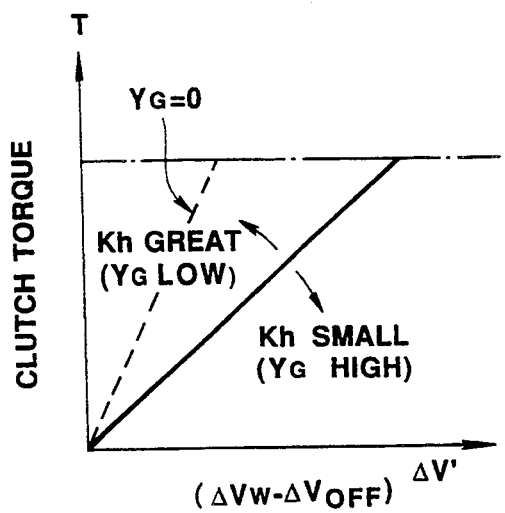
FIG. 5 is a graph showing a characteristic of a clutch torque with respect to a corrected front and rear wheel speed difference, which is employed in the control system shown in FIG. 2.
Figure 7:
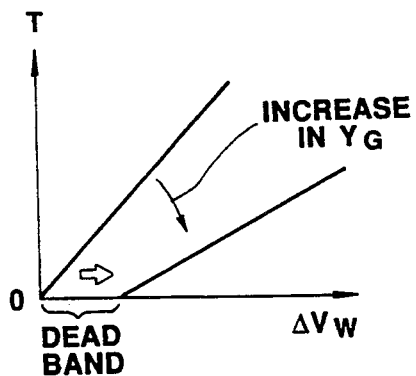
FIG. 7 is a graph for illustrating how the control system shown in FIG. 2 varies the control characteristic in accordance with the lateral acceleration.

When the vehicle is in a cornering motion, and the lateral acceleration increases, the control system determines, at the step 83, the dead band coefficient $K_{OFF}$ corresponding to the magnitude of the lateral acceleration $Y_G$ according to a parabolic characteristic shown by a solid line in FIG. 6. Then, the control system determines the dead band $\Delta V_{OFF}$ by using the dead band coefficient $K_{OFF}$ and the vehicle body speed $V_i$ at the step 84, and further determines the corrected front and rear wheel speed difference $\Delta V'$ resulting from subtraction of the dead band $\Delta V_{OFF}$ from the actual wheel speed difference $\Delta V_w$. The corrected wheel speed difference $\Delta V'$ is no longer equal to the actual wheel speed difference $\Delta V_w$. The control gain $K_h$ of the control characteristic of the clutch torque T with respect to the corrected wheel speed difference $\Delta V'$ is decreased as the lateral acceleration increases, as shown in FIG. 5. As the lateral acceleration $Y_G$ increases, the control gain $K_h$ is increased and the slope of the control characteristic is made steeper, as shown by a solid straight line in FIG. 5. This control system increases the dead band and decreases the control gain $K_h$ with increase in the lateral acceleration $Y_G$, as shown in FIG. 7.

This control system improves the cornering performance by controlling the driving force distribution in the following manner.

(i) During a steady state cornering on a low $\mu$ road surface, the control system determines the clutch torque T by using a very small value of the dead band, and a high value of the control gain $K_h$. In this cornering operation, however, the driving torque is approximately equal to zero, and the front and rear wheel speed difference is nearly zero. This control system holds the front and rear wheel driving force distribution ratio almost at 0:100, and thereby provides the steering response comparable to s a rear wheel driving vehicle.

(ii) In a cornering operation on a lower $\mu$ surface with acceleration, the control system controls the clutch torque T by using the very small dead band and the high control gain $K_h$. As the front and rear wheel speed difference increases with increase in the acceleration, therefore, the control system increases the driving torque transmitted to the front wheels 10, and varies the torque distribution ratio from 0:100 to 50:50 in accordance with the acceleration. Thus, the control system prevent a steep increase in the oversteering tendency and improve the controllability of the vehicle. In this cornering and accelerating operation on a low m road surface, the dead band is held so small that no or little substantial influence is exerted.

(iii) In a steady state cornering on a high $\mu$ surface, the control system controls the clutch torque T by using the large dead band and the low control gain $K_h$. In this steady state cornering operation, however, the driving torque is nearly zero, and the front and rear wheel speed difference is very low. This control system holds the front and rear wheel driving force distribution ration almost at 0:100, and enables the driver to steer the vehicle like a rear wheel drive vehicle.

(iv) In a cornering and accelerating operation on a high $\mu$ surface: When the vehicle is in a cornering motion with acceleration on a high $\mu$ road surface, but the lateral acceleration is relatively low so that the dead band is small, then the control system determines the clutch torque T by using the control gain $K_h$ corresponding to the lateral acceleration. In an initial stage of the acceleration, in which the front and rear wheel speed difference is still low, the control system represses an increase of the driving torque transmitted to the front wheels 10, and ensures the good steering response.

When the acceleration is further increased and the lateral acceleration becomes high as in a cornering operation near the limits, then the dead band $\Delta V_{OFF}$ is set high, and the control gain $K_h$ is made low. In this case, the depression of the accelerator pedal increases the actual front and rear wheel speed difference. However, this control system does not respond to this increase of the actual frond and rear wheel speed difference until it exceeds the dead band (the magnitude of the dead band). When the actual front and rear wheel speed difference exceeds the dead band, the control system increases the front wheel driving torque in such a gradual manner as to prevent an abrupt increase of oversteering. According to the principle of friction circle, the side force of the front wheels 10 increases in accordance with a decrease of the driving torque for the front wheels 10 caused by the dead band $\Delta V_{OFF}$, and the steering response is improved accordingly. As a result, even in a critical range of the high lateral acceleration cornering operation, this control system enables the driver to control the slip angle of the rear wheels 6 by operating the accelerator pedal, and controls the slip angle of the front wheels 10 by operating the steering wheel. The controllability of the vehicle is very high.

Figure 8:
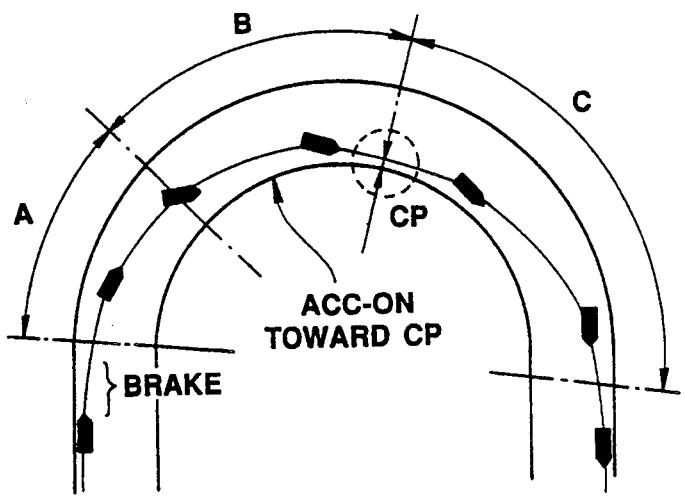
FIG. 8 is a schematic view illustrating a high lateral acceleration cornering motion of a vehicle equipped with the control system shown in FIG. 2.
Figure 9:
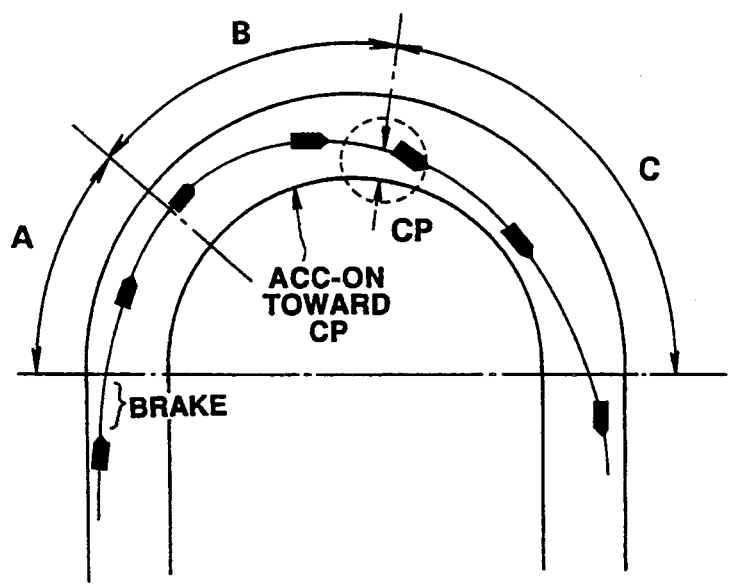
FIG. 9 is a schematic view illustrating a high lateral acceleration cornering motion of a vehicle equipped with a conventional control system.

FIG. 8 schematically shows a path traveled by the vehicle in a high lateral acceleration cornering motion. When the driver depresses the accelerator toward a corner post in a middle period B of the cornering, then the front wheel driving torque is held at a relatively low level, and the front wheel side force increases. Therefore, the direction of the vehicle is faithfully controlled by driver's steering operation, and the vehicle can reach the target corner post speedily.

The control system of the illustrated example of the invention employs the dead band $\Delta V_{OFF}$ in the form of a second-degree continuous function of the lateral acceleration $Y_G$ for the following reasons.

The low lateral acceleration cornering operation is an operation range in which the road surface is a low $\mu$ surface or the front wheels do not require a large side force. Therefore, in order to improve the driving performance, it is desirable to reduce the dead band to zero and to swiftly vary the driving torque distribution to the four wheel driving state.

If the dead band coefficient $K_{OFF}$ were determined by a linear function as shown in a one dot chain line in FIG. 6, then the front wheel driving torque might be held high below a lateral acceleration value $Y_{G1}$ shown in FIG. 6, and decreased abruptly at the lateral acceleration value $Y_{G1}$, resulting in an undesired effect on the vehicle behavior. Therefore, it is desirable to increase the dead band in the form of a continuous function with increase in the lateral acceleration. Specifically, the form of a high degree function having a degree equal to or higher than two can hold the dead band $\Delta V_{OFF}$ at low values in a low lateral acceleration range, while the dead band can be decreased sufficiently high in a high lateral acceleration range. The dead band $\Delta V_{OFF}$ in the form of the higher degree function is effective in improving both the driving capability in the low lateral acceleration cornering operation and the controllability near the cornering limits simultaneously.

The dead band $\Delta V_{OFF}$ of the illustrated example is also dependent on the vehicle body speed $V_i$, and increased as the vehicle body speed $V_i$ increases. The improvement in vehicle controllability near the limits, effected by the dependence of the dead band on the lateral acceleration $Y_G$ is effective specifically in a large turning radius cornering in which the lateral acceleration remains high for long. In a small turning radius cornering operation, on the other hand, the response characteristic of the driving torque transmitted to the front wheels is crucial rather than the dead band $\Delta V_{OFF}$. Therefore, the control system of this example increases the dead band $\Delta V_{OFF}$ with increase in the vehicle body speed $V_i$ by employing, as a control parameter, the vehicle speed $v_i$ which becomes high in the high lateral acceleration, large turning radius cornering operation, and which becomes low in the high lateral acceleration small turning radius cornering operation. When the turning radius is small, this control system improves the cornering stability by increasing the increasing tendency of the front wheel driving torque so as to prevent a steep increase of oversteering. As the turning radius increase, the control system imposes severer restraint on the increase of the front wheel driving torque, and attaches greater importance to the controllability of the vehicle.

Figure 1:
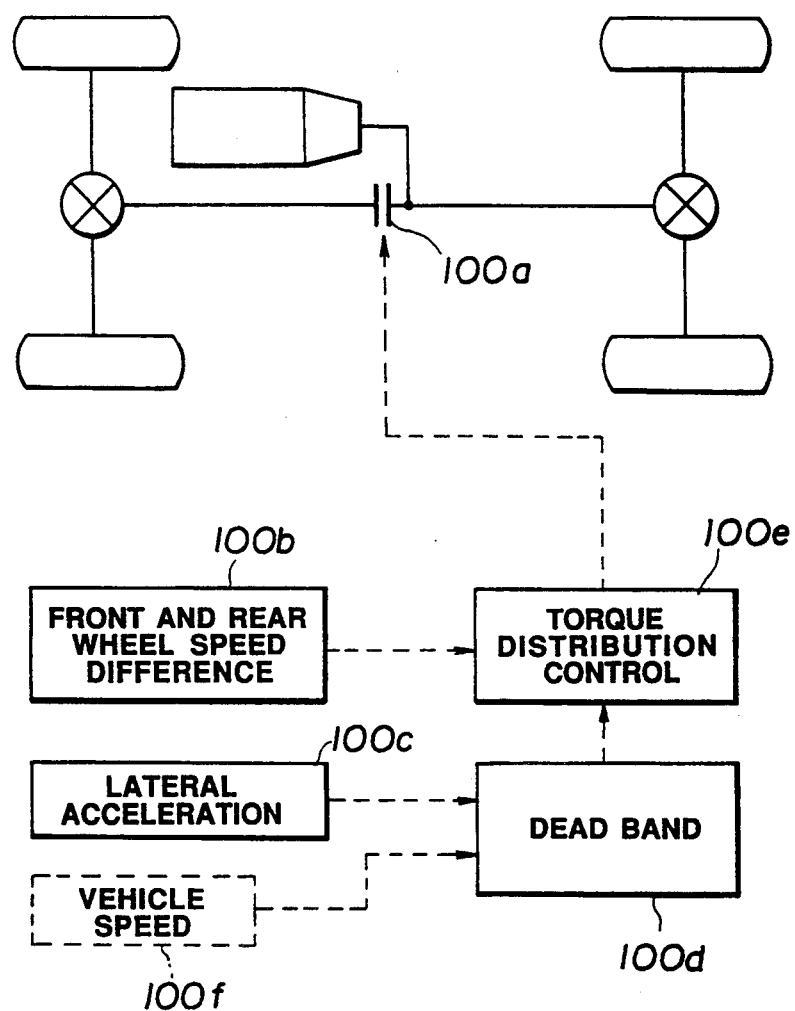
FIG. 1 is a schematic view showing an arrangement of various functional means employed in the present invention.

FIG. 1 shows one example of an arrangement of various means employed in the present invention. A driving force distribution control system schematically shown in FIG. 1 includes at least a torque distribution clutch 100a such as the transfer clutch 11a shown in FIG. 2, a means 100b for sensing or determining a front and rear wheel speed difference, a means for sensing a lateral acceleration of the vehicle, a means for setting a dead band in accordance with the lateral acceleration, and a means 100e for controlling the torque distribution between the front and rear wheels of the vehicle. The control system may further comprise a means 100f for sensing a vehicle speed.

What is claimed is:

1. A driving force distribution control system for a vehicle, said control system comprising:
   a torque distributing clutch for varying a driving torque transmitted from an engine of the vehicle to front wheels of the vehicle in accordance with a control signal while rear wheels of the vehicle are directly connected with the engine;
   a front and rear wheel speed difference sensing means for sensing an actual front and rear wheel speed difference;
   a lateral acceleration sensing means for sensing a lateral acceleration of the vehicle;
   a dead band setting means for setting a predetermined front and rear wheel speed difference dead band in accordance with the lateral acceleration at least when the lateral acceleration is high; and
   a driving force distribution controlling means for producing said control signal in accordance with a difference resulting from subtraction of said dead band from said actual front and rear wheel speed difference.

2. A driving force distribution control system according to claim 1 wherein said dead band setting means is a means for setting said dead band which is a higher degree function of said lateral acceleration, said high degree function being one of a quadratic function and a function of a higher degree higher than two.

3. A driving force distribution control system according to claim 1 wherein said control system further comprises a vehicle speed sensing means for sensing a vehicle speed of the vehicle, and said dead band setting means is a means for increasing said dead band as said vehicle speed increases.

4. A vehicle comprising:
   a power unit comprising an engine;
   a wheel system comprising left and right front wheels and left and right rear wheels;
   a drive system for transmitting a driving torque from said power unit to said front and rear wheels, said drive system comprising an input member for receiving the driving torque from said power unit, a first output member for driving said rear wheels, a second output member for driving said front wheels, and a torque distributing clutch through which said second output member is drivingly connected with said input member;
   a sensor group comprising rotation sensors for sensing an actual wheel speed of each of said front and rear wheels, and a sensor for sensing a turning motion of the vehicle;
   an actuator for varying a clutch engagement force of said torque distributing clutch in accordance with a control signal; and
   a controller for receiving signals from said sensors, determining an actual front wheel speed of said front wheels, an actual rear wheel speed of said rear wheels, an actual front and rear wheel speed difference which is a difference resulting from subtraction of said front wheel speed from said rear wheel speed, an actual lateral acceleration of the vehicle, a dead band which increases with increase in said lateral acceleration, a corrected front and rear wheel speed difference which is a difference resulting from subtraction of said dead band from said actual front and rear wheel speed difference, and a desired control magnitude which increases with increase in said corrected wheel speed difference, and producing said control signal representing said desired control magnitude.

5. A vehicle according to claim 4 wherein said dead band is a quantity proportional to the second power of said lateral acceleration.

6. A vehicle according to claim 5 wherein said dead band is a quantity which increases as a vehicle speed of the vehicle increases.

7. A vehicle according to claim 4 wherein said dead band is proportional to a product obtained by multiplying the second power of said lateral acceleration by a vehicle speed of the vehicle.

8. A vehicle according to claim 7 wherein said desired control magnitude is equal to a product obtained by multiplying said corrected front and rear wheel speed difference by a control gain which is inversely proportional to said lateral acceleration.

9. A vehicle according to claim 8 wherein said sensor for sensing the turning motion comprises first and second lateral acceleration sensors each producing a signal representing a sensed lateral acceleration of the vehicle, said actual lateral acceleration is an arithmetic mean of said sensed lateral accelerations, said front wheel speed is an arithmetic mean of said actual wheel speeds of said front left wheel and said front right wheel, said rear wheel speed is an arithmetic mean of said actual wheel speeds of said rear left wheel and said rear right wheel, and said vehicle speed is equal to said actual front wheel speed.

10. A vehicle comprising:
a power unit comprising an engine and a transmission;
a wheel system comprising left and right front wheels and left and right rear wheels;
a drive system comprising a transfer, a front drive line comprising a front differential connected between said left and right front wheels and a front propeller shaft drivingly connecting said front differential with said transfer, and a rear drive line comprising a rear differential connected between said left and right rear wheels and a rear propeller shaft driving connecting said rear differential with said transfer, said transfer comprising an input member connected with said transmission, a first output member which is always connected with said input member of said transfer and which is further connected with said rear propeller shaft, a second output member which is drivingly connected with said front propeller shaft, and a multiple disk transfer clutch for continuously varying a driving torque transmitted to said left and right front wheels, said second output member being connected through said transfer clutch with said input member;
a hydraulic system comprising a solenoid valve for producing said control oil pressure in accordance with an electric control signal;
a sensor group for sensing a wheel speed of each of said wheels, and a lateral acceleration of the vehicle; and
a controller for determining an actual front wheel speed which is an arithmetic mean of the wheel speeds of said left and right wheels, an actual rear wheel speed which is an arithmetic mean of the wheel speeds of said left and right wheels, an actual front and rear wheel speed difference which is a difference resulting from subtraction of said actual front wheel speed from said actual rear wheel speed, a dead band which is a quantity continuously increasing as said lateral acceleration increases, a corrected front and rear wheel speed difference which is a difference resulting from subtraction of said dead band from said actual front and rear wheel speed difference, a control gain which is inversely proportional to said lateral acceleration, and a desired clutch engagement force which is a product resulting from multiplication of said corrected front and rear wheel speed difference by said control gain, and for producing said control signal representing said desired clutch engagement force.

11. A vehicle according to claim 10 wherein said controller comprises a means for computing said actual front and rear wheel speeds, a means for determining an estimated vehicle speed which is equal to said actual front wheel speed, a means for computing said actual front and rear wheel speed difference, a means for computing the second power of said lateral acceleration and determining a dead band coefficient by multiplying the second power of said lateral acceleration by a predetermined constant, a means for computing said dead band by multiplying said dead band coefficient by said vehicle body speed, a means for computing said corrected front and rear wheel speed difference, a means for determining said control gain, and a means for computing said desired clutch engagement force.

* * * * *